(12) United States Patent
Eddy et al.

(10) Patent No.: US 7,140,284 B2
(45) Date of Patent: Nov. 28, 2006

(54) DEVICE FOR COLD CUTTING ELONGATE MEMBERS ALONG A LONGITUDINAL AXIS

(75) Inventors: Edwin James DuMorris Eddy, Nr. Scunthorpe (GB); Shay Vincent Eddy, Scunthorpe (GB); Delville Edwin Eddy, Scunthorpe (GB); Paul Anthony Eddy, Scunthorpe (GB)

(73) Assignee: Edmet International Limited, North Lincolnshire (GB)

( * ) Notice: Subject to any disclaimer, the term of this patent is extended or adjusted under 35 U.S.C. 154(b) by 66 days.

(21) Appl. No.: 09/380,351

(22) PCT Filed: Mar. 2, 1998

(86) PCT No.: PCT/GB98/00648

§ 371 (c)(1),
(2), (4) Date: Aug. 31, 1999

(87) PCT Pub. No.: WO98/39126

PCT Pub. Date: Sep. 11, 1998

(65) Prior Publication Data

US 2002/0059852 A1   May 23, 2002

(51) Int. Cl.
*B23D 53/08*   (2006.01)
*B23D 55/02*   (2006.01)
*B23D 55/04*   (2006.01)

(52) U.S. Cl. .................. 83/23; 83/27; 83/112; 83/156; 83/158; 83/162; 83/420; 83/425; 83/436.3; 83/436.6; 83/436.75; 83/437.2; 83/437.5; 83/444; 83/446; 83/449; 83/788; 83/DIG. 2

(58) Field of Classification Search .................. 83/425, 83/438, 444, 446, 788, 23, 27, 102, 102.1, 83/128, 155, 156, 158, 161, 162, 167, 420, 83/421, 435.15–435.19, 436.3, 436.6, 436.7, 83/436.75, 437.2–437.7, 447–450, 732, 870, 83/871, 874, DIG. 2

See application file for complete search history.

(56) References Cited

U.S. PATENT DOCUMENTS

| | | | | |
|---|---|---|---|---|
| 3,556,177 A | * | 1/1971 | Cleland | 83/812 |
| 3,687,269 A | * | 8/1972 | Fritz et al. | 83/112 X |
| 3,903,771 A | * | 9/1975 | Fritz et al. | 83/102.1 |
| 4,127,044 A | * | 11/1978 | Kenyon | 83/446 |
| 4,144,782 A | * | 3/1979 | Lindstrom | 83/446 X |
| 4,333,370 A | * | 6/1982 | Sack | 83/102.1 X |
| 4,422,543 A | * | 12/1983 | Stubbings | 198/782 |
| 4,452,118 A | * | 6/1984 | Muller | 83/446 X |
| 4,599,929 A | * | 7/1986 | Dutina | 83/446 X |
| 4,693,761 A | * | 9/1987 | Bohm et al. | 148/196 |
| 4,833,960 A | * | 5/1989 | Patterson | 83/420 |
| 4,938,111 A | * | 7/1990 | Masse | 83/425.3 |
| 5,033,610 A | * | 7/1991 | Lehmler et al. | 198/782 |

* cited by examiner

*Primary Examiner*—Clark F. Dexter
(74) *Attorney, Agent, or Firm*—Jackson Walker, LLP

(57) ABSTRACT

A cold separation device for separating an elongate metallic member along its length. The device has a separation unit having a driven blade, support member to support the elongate member upstream and downstream of the separation unit. The device further has to feed the elongate member towards and through the separation unit.

2 Claims, 6 Drawing Sheets

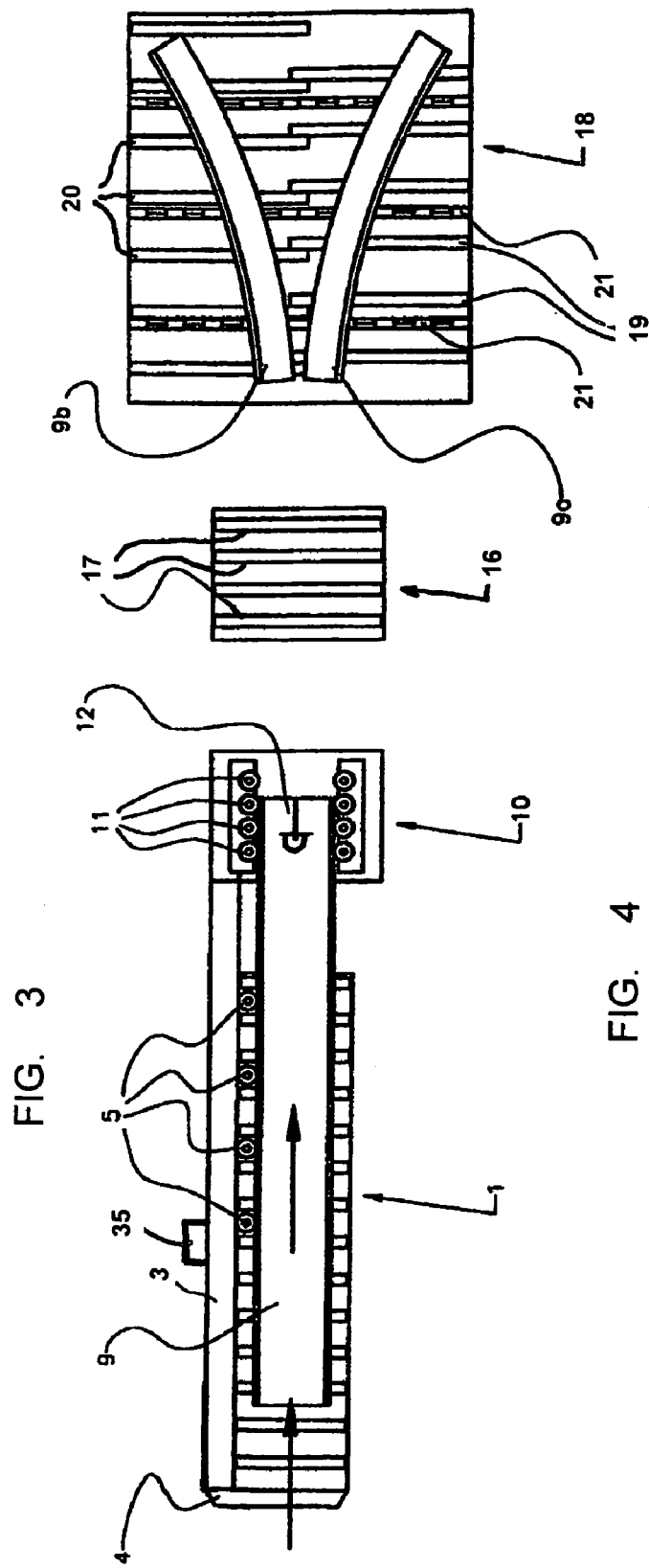
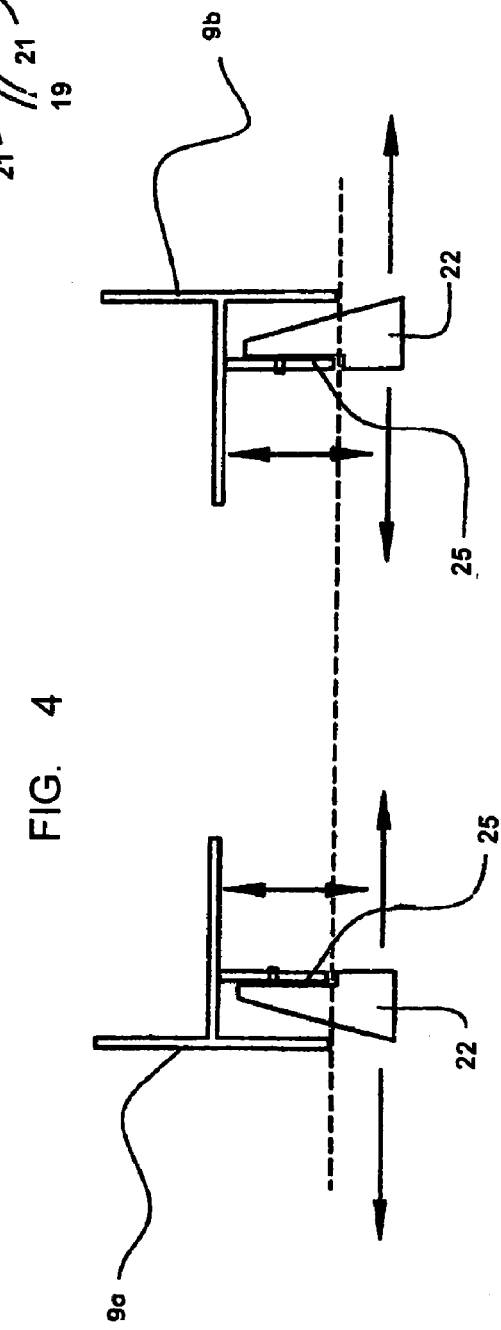
FIG. 3
FIG. 4

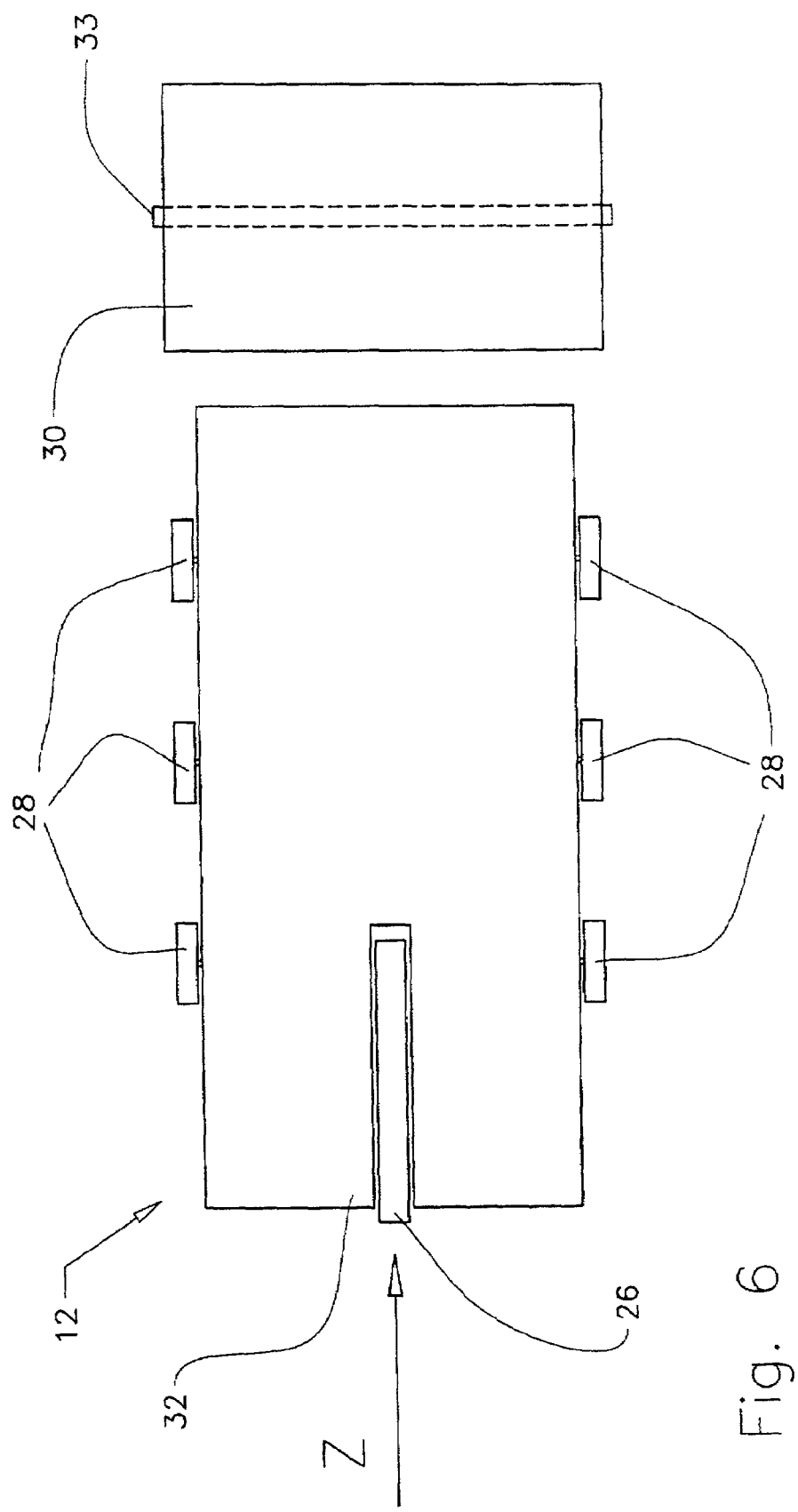

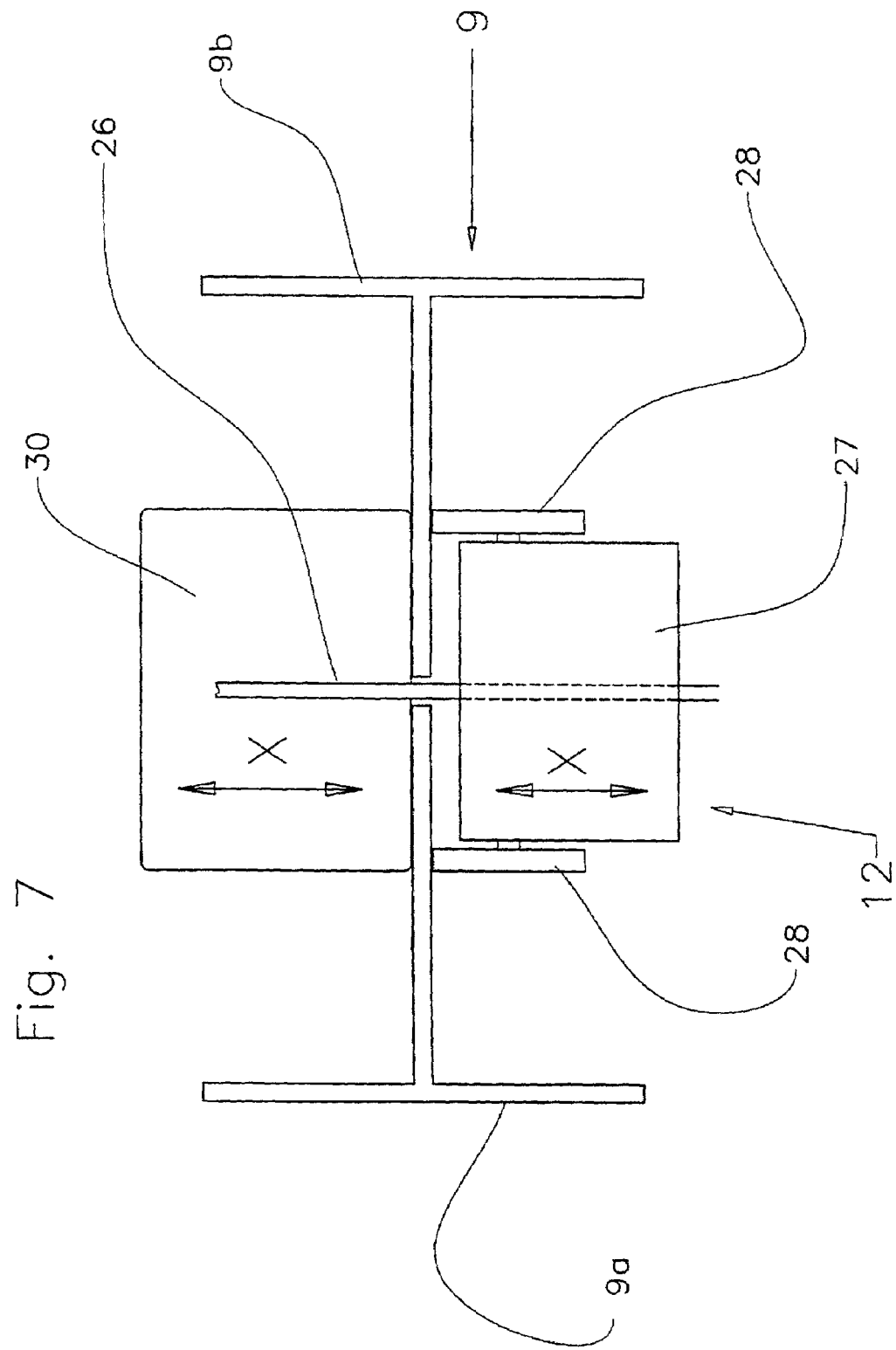

DEVICE FOR COLD CUTTING ELONGATE MEMBERS ALONG A LONGITUDINAL AXIS

FIELD OF THE INVENTION

This invention relates to a device for separating elongate members along a longitudinal axis, and to a method of separating elongate members along a longitudinal axis using the device of the invention.

BACKGROUND TO THE INVENTION

Steel sections and steel piling often require splitting along their lengths to provide a desired shape of section. For example, by splitting an "I" beam along the longitudinal centre line of the web thereof, a pair of "T" sections can be produced. Similarly, by splitting a box section along the longitudinal centre line thereof, a pair "U" shaped channel members can be produced. Many other shapes can be produced by starting with differently shaped products including double rolled sections, for instance bulb flats, conventional flats, grader bars and channels can all be double rolled and then split along their lengths.

Traditionally, oxy-propane or oxy-acetylene torches have been used to split elongate steel members longitudinally. When splitting a member using such torches it is common practice when commencing splitting to cut the member at spaced apart intervals in order to avoid the halves of the member bowing outwards or inwards. This practice is known as stitching. As a secondary operation, the stitches (which are short in comparison with the cuts) are removed, again using and oxy-propane or oxy-acetylene torch. Using these torches poses a number of problems. Firstly, the separating process is slow and requires a significant amount of labour. Secondly, the operation is dangerous. Occasionally, the stitches holding the member together are too weak to withstand the internal stresses in the member created during its manufacture. If this is so, the member may break the stitches and spring outward or inward without warning. Such an event could result in injury or loss of life. Thirdly, heat generated during separation accentuates any inherent tendency in the member to bend during separation. Fourthly, the finish on the separated edges is of a low standard and often requires milling to establish an edge that can be welded to.

In order to overcome the problem of speed of operation, and quality of finish plasma guns have been introduced. However, these still often use the "stitching" technique Additionally, plasma guns operate at higher temperatures than do flame cutters, i.e. oxy-propane or oxy-acetylene torches. Whilst less dross and slag is produced during separation with plasma cutting compared to flame cutting, the resulting edges must nevertheless be dressed. The heat generated during flame and plasma cutting also causes metallurgical changes to the steel in the region of the cut. In plasma cutting the region can extend 5 mm to 15 mm to either side of the cut along the full length thereof, whereas in flame cutting the metallurgical changes extend further but are less marked. As the steel cools, or when it is straightened cracking can occur. These metallurgical changes are unacceptable, and because of this, the industry will not permit the splitting of members having a web thickness of 20 mm or greater using plasma guns or flame cutting.

In terms of rolling steel, it can be advantageous to double roil sections, i.e. two angles are rolled as a channel. This is because the throughput of the mill is increased, and therefore its costs of production are decreased. It is known to split double rolled sections in half by snapping the section in two along a line of weakness. For example, angles may be formed by splitting a channel along a longitudinal line of weakness. The problem with sections produced by double rolling and splitting them in the manner described is that the finish is extremely poor.

In U.S. Pat. No. 5,033,610 a support station is described, the station being used to support workpieces shaped as U-, I-, L-, T- or circular profiles, whilst they are cut using a flame cutter. The workpieces are cut to length, rather than longitudinally.

In U.S. Pat. No. 4,693,761 a device and process for cutting or welding profiles using a robot having a cutting torch attached thereto is described. The device and process are used for cutting profiles to length, rather than for cutting them longitudinally.

SUMMARY OF THE INVENTION

According to the invention, there is provided a cold separation device for separating an elongate member along its length, the device comprising a separation unit comprising a cutter, support means to support the elongate member upstream and downstream of the separation unit, and a feeder means to feed the said member towards and through the separation unit.

The cutter may comprise a saw blade, the said blade being a reciprocating blade, or a band saw blade. Alternatively, the cutter could comprise a water jet. The speed of the blade and/or the feeder means may be adjustable. Advantageously, the speed of the band saw blade is adjustable between 40 and 190 meters per minute. The speed of the feeder means is suitably adjustable between 0 and 1 meter per minute.

The separation unit may comprise a support means to support the underside of an elongate member.

Preferably, the separation unit comprises means to constrain lateral movement of an elongate member passing therethrough. The said means to constrain lateral movement of an elongate member may comprise at least one pair of horizontally spaced apart guide members, said guide members suitably being rollers rotatable about a substantially vertical axis. Each guide member of a pair may be mounted so that the distance therebetween is variable. Advantageously, the roller carriers are each mounted on a threaded spindle. Preferably, the or each roller is mounted on a roller carrier, and a pair of roller carriers is provided, the roller carriers being movable towards and away from each other. The roller carriers may be mounted on the same threaded spindle, the threads thereof winding in opposite directions towards or away from the centre of the spindle.

The separation unit suitably comprises a roller arranged to exert a downward pressure on a part of an elongate member being cut.

Preferably, upstream of the separation unit the support means is provided with alignment means to align a substantially longitudinal axis of the elongate member with the blade of the separation unit. The said alignment means may comprise at least two guides each mounted so as to be movable laterally to the support means. Each guide may be mounted on a threaded spindle to provide for the said lateral movement. Each guide may comprise at least one wheel.

The said support means may comprise at least one support table located upstream of the separation unit and at least one support table located downstream of the separation unit. Preferably, at least one table mounted down stream of the separation unit is a receiving table and is so dimensioned as to enable it to receive and support separated sections issuing from the separation unit. The said receiving table may comprise at least one pair of support members, each member being mounted on the table so as to be movable horizontally and vertically so as to engage with and support a section of a separated elongate member. Each support member suitably comprises a roller. Advantageously, the receiving table further comprises means to move a section of a separated elongate member resting thereon laterally across the table. The said means may comprise at least one conveyor, the or each conveyor being provided with at least one upstanding chock protruding above the surface of the table so as to engage with a section resting on the table. At least one of the tables may comprise a plurality of rollers. The rollers of at least one table are driven. Preferably, at least one table located upstream of the separation unit comprises the said feeder means.

Another aspect of the invention provides a process for separating elongate members using a longitudinal cold separation device according to the invention comprising the steps of:
a. placing an elongate member on the support means of the device;
b. aligning a longitudinal axis of the elongate member with the blade of the separation unit;
c. feeding the elongate member through the separation unit; and
d. supporting the resulting separated sections.

The process may further comprise the step of constraining lateral movement of the elongate member in the separation unit.

The process may further comprise the step of supporting the separated sections issuing from the separation unit.

The process may further comprise the step of moving the separated sections across the receiving table of the invention.

The process may be characterised by controlling the speed of the blade and/or the feeder means.

The device of the invention can be operated substantially manually. However, the adjustment of the alignment means, the support means, the pressure roller and the lateral constraining means of the separation unit, and the support members of the receiving table may all be adjusted using suitable actuators, for example linear motors, hydraulic rams or motors, or electric motors. Each of these actuators may be controlled remotely from a work-station.

The device and process of the invention are particularly advantageous because the finish of the edge cut by the device of the invention is far superior to the finish of the cut edge produced by known hot separation techniques. The finish provided by the device according to the invention permits welding thereto with no further finishing process, whereas to achieve an equally good finish on a member cut using known techniques a further process, for example milling of the cut edge, would be required. In addition to its use for separating, in appropriate circumstances the device and process can be used instead of milling to provide a finished edge on an elongate product. The process of the invention does not induce the metallurgical changes induced by plasma cutting, and therefore the separation process of the invention can be used for webs of all thickness including webs having a thickness of 20 mm or greater. The absence of heat in the process means that the resulting separated pieces are not bent to the same degree as those resulting from a hot separation process. This is significant because there is a high labour cost involved with straightening out bent sections. The device also permits double rolled sections to be split. It is particularly desirable for rolling mills to be able to double roll sections, since this reduces costs. Lastly, the device and process of the invention are much safer to use than known separation methods. This is because a continuous cut is made along the length of the member to be separated, rather than using the stitching technique, and furthermore, there is no requirement for the operator to be close to the member being separated.

BRIEF DESCRIPTION OF THE DRAWINGS

In the drawings which illustrate an exemplary embodiment of a longitudinal cold separation device according the invention:
FIG. 3 is plan view of a part of the device shown in FIG. 1 having an I-beam mounted thereon;
FIG. 4 is an end view of the support members of the receiving table supporting the separated sections of an I-beam mounted thereon;
FIG. 6 is a plan view of the part illustrated in FIG. 5;
and
FIG. 7 is an end view of the part illustrated in FIGS. 5 and 6.

DETAILED DESCRIPTION OF THE PREFERRED EMBODIMENTS

Figure 1:
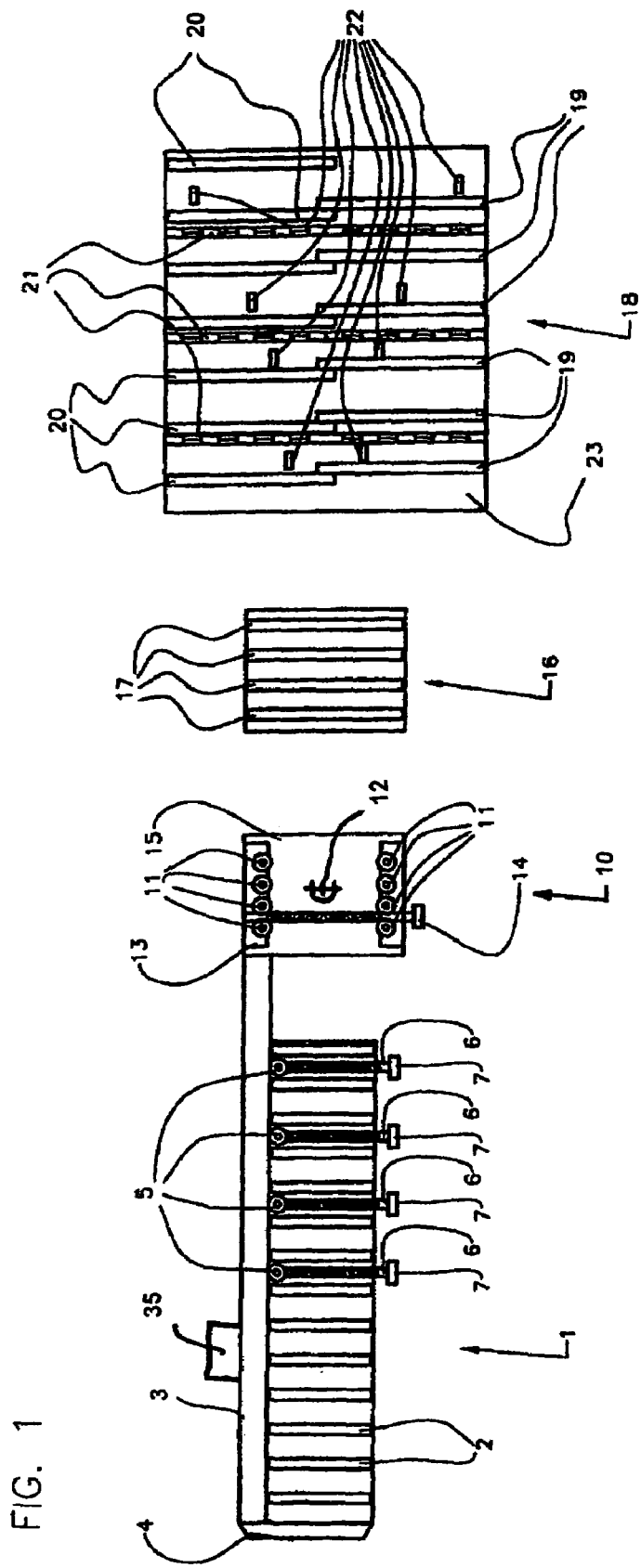
FIG. 1 is a plan view of a longitudinal cold separation unit according to the invention.

FIG. 1 illustrates a longitudinal cold separation device comprising support means in the form of a table 1, the table comprising a plurality of horizontal rollers 2, a pusher arm 4 which is driven by an electric motor, and a rack 3. The electric motor drives a pinion which engages with the rack 3 to move the pusher arm 4 back and forth along the table. The electric motor suitably drives the pinion through a gear box, all of which form a linear drive mechanism 35. The electric motor, gearbox, pinion and rack 3 are not shown in detail, since these features are well known to those skilled in the art and are commonly available. The table 1 is provided with a plurality of alignment wheels 5. The alignment wheels 5 are mounted on a threaded spindle 6 so that when the handle 7 of a spindle 6 is turned, the alignment wheel 5 mounted thereon moves across the table.

Figure 2:
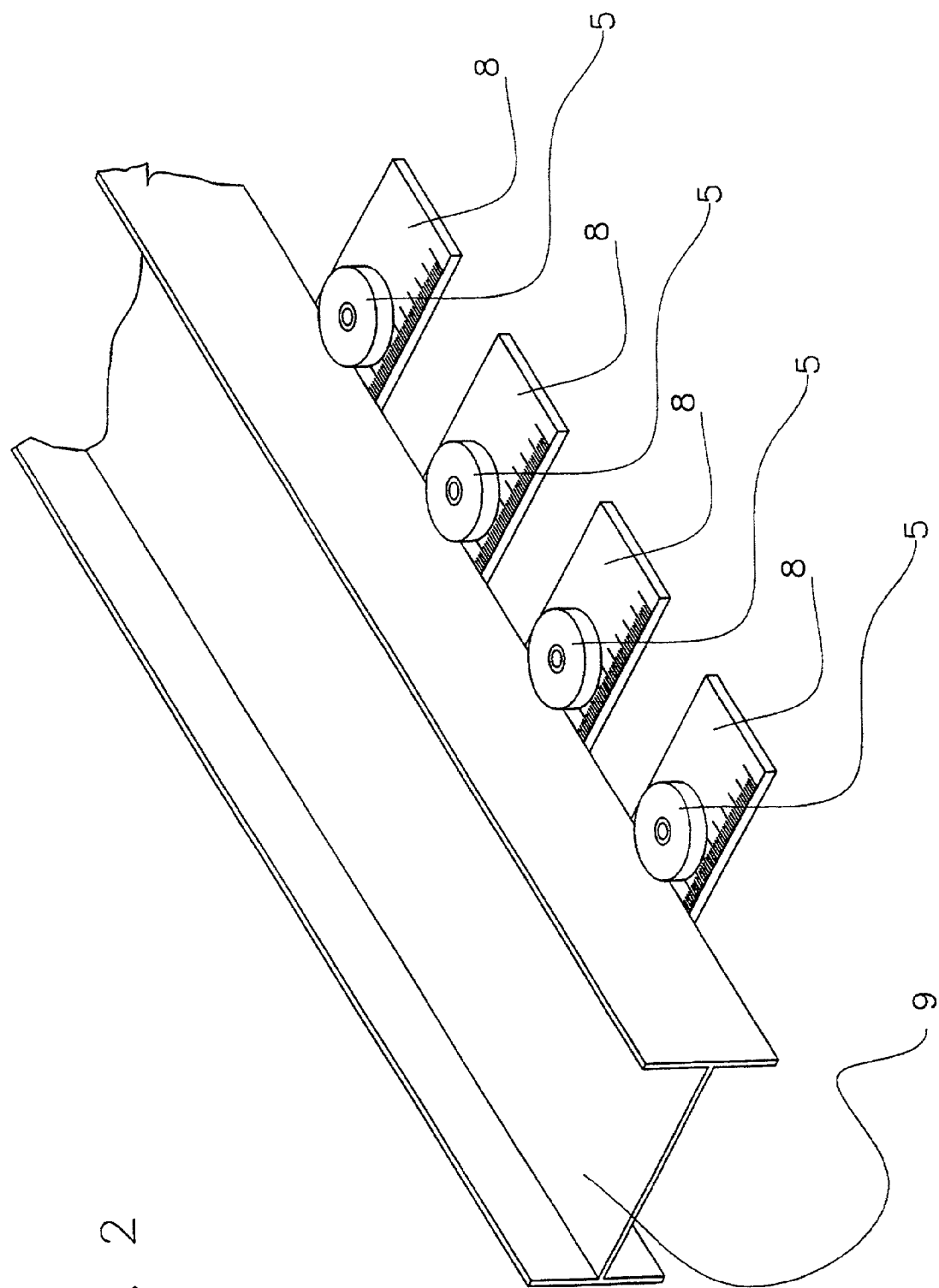
FIG. 2 is schematic representation of a part of the device shown in FIG. 1 carrying an I-beam.

The alignment wheels are also shown in FIG. 2. It can be seen that scales 8 are provided for each alignment wheel so that an elongate member such as the I-beam 9 can be cut lengthways along a desired axis. Usually, the elongate member is positioned so that the centre line thereof is aligned with the blade of the cold separation means 12.

Referring again to FIG. 1, it can be seen that the support means further comprises a second table 16 and a cold separation unit 10 located between the tables 1, 16. The second table 16 comprises a plurality of driven rollers 17. Rollers 17 may be driven by any suitable means, such as an electric or hydraulic motor (not shown). The cold separation unit comprises a plurality of vertically mounted rollers 11. The rollers 11 are mounted on a frame 13 which is in turn slidably mounted on the frame 15 of the cold separation unit 10. A threaded spindle 14 provides for movement of the rollers 11 towards and away from the cold separation means 12.

Downstream of the second table 16 the support means comprises a third table 18 comprising a frame 23 having a plurality of rollers 19 mounted therein. It can be seen that pairs of rollers 19 are employed to extend across the width of the table 23, and that the rollers 19 of a pair are off-set and over lap. A pair of rollers is used instead of a single roller because when the elongate member reaches the third support member it is at least partially separated into two sections. The table 23 is also provided with a plurality of support members 22 which are movable in both the horizontal and vertical directions. Additionally, the table 23 is provided with means to move separated elongate members from one side of the table to another. The said means comprises three spaced apart conveyors 21. The conveyors can be driven independently, and each comprises a chain extending around rollers. Each chain is provided with at least one upstanding chock which extends above the upper surface of the table 23. The manner in which the conveyors 21 and the support members 22 function is described in greater detail with reference to FIG. 4.

Figure 5:
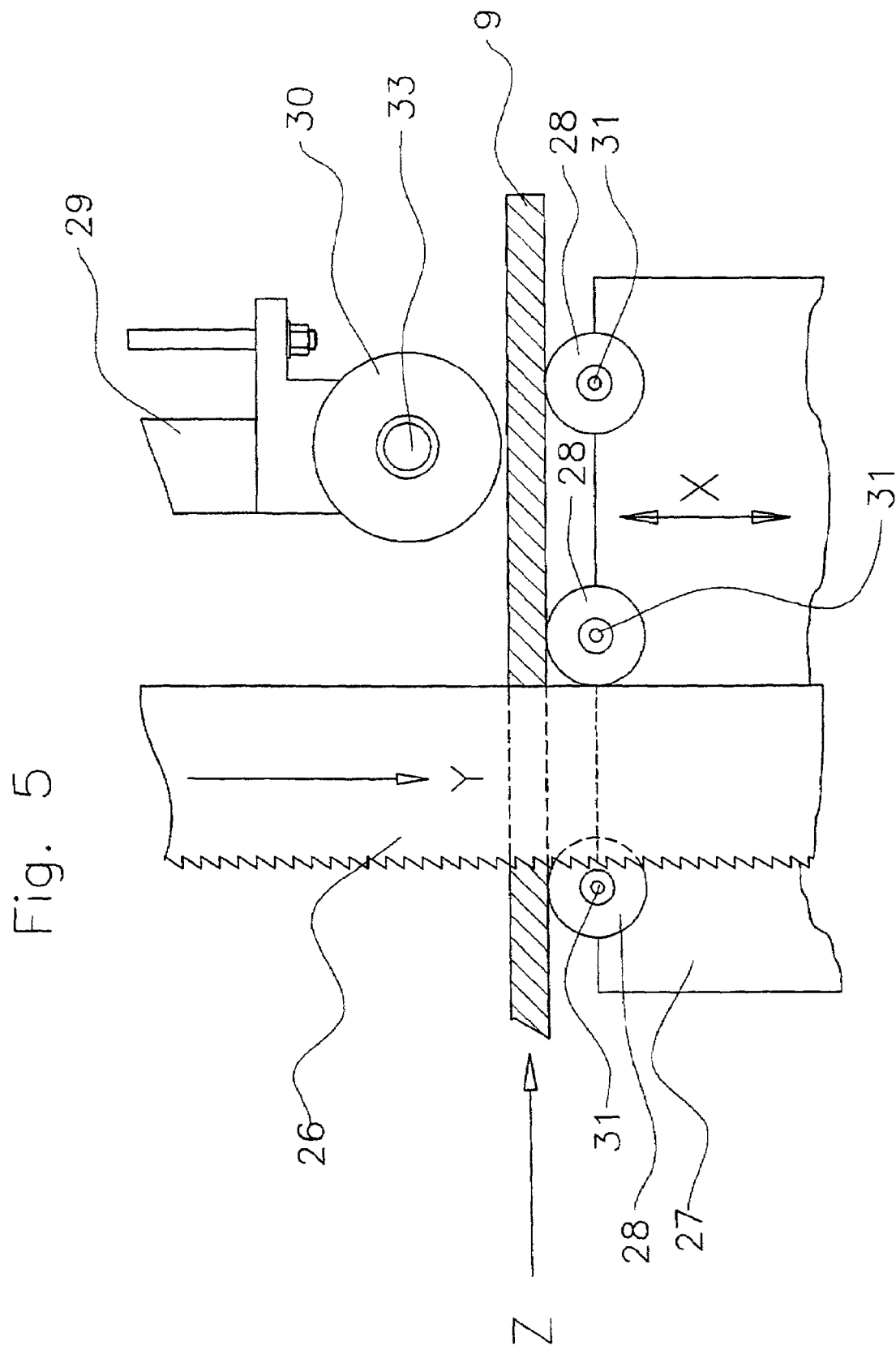
FIG. 5 is a partial cross-section of a part of the separation means of the device.

The cold separation means is shown in detail in FIGS. 5 to 7. The cold separation unit 10 comprises a band saw having a saw blade 26 which passes through a slot 32 in a support block 27 moving in the direction indicated by arrow Y. The support block 27 carries three pairs of support rollers 28, each roller being mounted on a shaft 31. The position of the support block 27 is movable vertically in the direction indicated by arrow X with respect to the frame 15 of the cold separation unit 10. This is so that the support rollers 28 can be raised or lowered into a position where they just touch, and thereby support, the part of the elongate member to be separated. In FIGS. 5 to 7, the support rollers 28 are supporting the web of an I-beam 9 travelling into the cold separation unit in the direction Z. The support block 27 can be raised or lowered by any suitable means, for example a hydraulic ram or a linear motor (not shown). Mounted above the support block 27 is a pressure roller 30 which is mounted on a carriage 29 by means of a shaft 33. The carriage 29 may be raised or lowered according to the dimensions of the elongate member to be separated, in order that the pressure roller 30 may rest on and exert a downward pressure on a part of the said elongate member. In order to provide for the collection of swarf during the separation process, the engaging surface may be roughened.

In FIG. 6, the pressure roller 30 is set back from the support block 27.

The process of longitudinal cold separation according to the invention will now be described with reference to FIGS. 1 to 7. The product to be separated, for example an I-beam 9 is lifted on to the first table 1 by means of a crane. The outside width of the beam is measured, and the handles 7 are turned so that the alignment wheels 5 bring the beam into a position where the desired line of separation is aligned with the saw blade 26 of the cold separation means 12. In most cases the desired line of separation will be the longitudinal centre line of the product to be separated, though offset cutting and edging can be carried out using the device and process of the invention.

The drive means driving the pusher arm 4 is activated and the beam 9 is pushed slowly in the direction indicated by arrow Z towards the cold separation unit 10.

The height of the support block 27, and hence the support rollers 28 is then adjusted so that the underside of the web of the I-beam 9 will rest on the said rollers. Initially, the pressure roller 30 is lifted clear of the I-beam 9.

When the I-beam 9 and the support block 27 are in the correct positions, the band saw is switched on. As saw blade 26 engages with the I-beam 9 cutting begins. The pusher arm continues to push the I-beam 9 past the saw blade 26. When the leading edge of the I-beam 9 has passed over the support block 27, fine adjustment of the height of the support block 27 may be made, and the pressure roller 30 may be brought down into engagement with the upper surface of the web of the I-beam 9, so that the position shown in FIG. 5 is reached.

The blade speed of the band saw is advantageously in the range 40 to 190 meters per minute. The pusher arm is advantageously driven at a speed in the range 0 to 1 meter per minute. These speeds are dependent upon the thickness and hardness of the product to be cut. Advantageously, the drive means driving the pusher arm can vary the speed infinitely in the desired range.

The downward pressure exerted on the web of the I-beam 9 by the pressure roller 30 attenuates vibration which reduces the possibility of saw blade failure and decreases noise levels.

As the I-beam 9 continues to be pushed in the direction Z, the underside thereof meets the second support means 16, the driven rollers 17 thereof pulling the I-beam 9 in the direction Z.

As the separation process continues, the separated end of the I-beam 9 reaches the third support means 18. The resulting left hand T-section 9b being supported on rollers 20, and the resulting right hand T-section 9a being supported by the rollers 19. As can be seen from FIG. 3, the T-sections produced by the cold separation process tend to be curved. This is due to the inherent stresses in the I-beam 9 caused by the rolling process. There is a tendency for the T-sections 9a and 9b to fall inwards. If the T-sections were to fall inwards, the saw blade may be damaged. In order to support the said T-sections, support members 22 (best shown in FIG. 4) are provided. As the leading edge of the T-sections moves past the first pair of support members 22 they are adjusted horizontally and vertically so that a roller 25 supports the under side of the web of each T-section 9a, 9b so that the flange of each section is substantially vertical. As the I-beam 9 is advanced further in the direction Z, so it becomes necessary to support the resulting T-sections 9a, 9b at more locations. Further pairs of support members 22 are therefore provided, each being adjustable horizontally and vertically so that the roller 25 thereof may engage with the web of one of the T-sections 9a, 9b.

When the I-beam 9 is fully separated, the rollers 17 of the second table 16 continue to be driven, thereby driving the T-sections 9a and 9b almost fully on to the third support means 18.

The T-section 9a can be removed from the receiving table 18 using a forklift truck for example. Before the T-sections are removed, the support members 22 are retracted. It may be desirable to be able to move the T-sections from one location on the table 18 to another. For example, where access to the table 18 is only available from one side, and a forklift truck is being used to remove the T-sections from the table, then it is necessary to move the T-section 9b across the table. This is done by the conveyors 21. As the conveyors 21 are driven, upstanding chocks come into engagement with the T-section 9b and push it from one side of the table 18 to the other, from where it can be lifted off.

Whilst the description refers to an I-beam, the device may be used to separate products having any profile, for example, box section, channel section, tubular section, piling, or flats, and double rolled sections. Where the products are suitably shaped to permit stacking thereof, for example double rolled section, flats, universal flats, a number of the products may be stacked one on top of the other to increase the through put of the machine.

The invention claimed is:

1. A cold separation device for separating a cold elongate metallic workpiece along a substantially longitudinal axis thereof into two separate parts, said device comprising:

separate first, second and third spaced apart workpiece supports, said first and third workpiece supports extending upstream and downstream respectively of said second workpiece support;

a separation unit mounting a cutting means, for cutting metal, wherein said second support comprises ancillary under-supports disposed laterally to either side of said metal cutting means and engagable with an underside of said elongate metallic workpiece, and means for constraining lateral movement of said workpiece passing through said separation unit, said constraining means comprising at least one pair of horizontally spaced apart non-driven guide rollers adjacent said metal cutting means, each guide roller of said pair being freely rotatable about a substantially vertical axis and spaced laterally to a respective side of said metal cutting means, said constraining means providing no lateral constraint of movement of said workpiece downstream of a most downstream pair of said non-driven guide rollers;

said first workpiece support including an elongate conveyor table comprising a plurality of horizontally dispose rollers, said third workpiece support including a receiving table arranged to receive and support fully separated workpieces issuing from said separation unit, wherein the width of said receiving table is substantially greater than the width of said second workpiece support; and a feeder consisting of:

a pusher upstream of said cutting means and adjacent said elongate conveyor table, said pusher movable back and forth between respective distal ends of said elongate conveyor table in a substantially horizontal plane by a linear drive means, and downstream of said cutting means, a plurality of horizontally disposed driven rollers engageable with an underside of said elongate metallic workpiece;

said first and third workpiece supports extending in substantially a common horizontal plane and said second support movable in a direction substantially perpendicular to said common horizontal plane.

2. A process for separating a cold elongate metallic workpiece along a substantially longitudinal axis thereof into two separate sections, said process comprising the steps of:

providing a separation device comprising:

separate first, second and third spaced apart workpiece supports, said first and third workpiece supports extending upstream and downstream respectively of said second workpiece support;

a separation unit mounting a cutting means for cutting metal, wherein said second support comprises ancillary under-supports disposed laterally to either side of said metal cutting means and engagable with an underside of said elongate metallic workpiece, and means for constraining lateral movement of said workpiece passing through said separation unit, said constraining means comprising at least one pair of horizontally spaced apart non-driven guide rollers adjacent said metal cutting means, each guide roller of said pair being freely rotatable about a substantially vertical axis and spaced laterally to a respective side of said metal cutting means, said constraining means providing no lateral constraint of movement of said workpiece downstream of a most downstream pair of said non-driven guide rollers;

said first workpiece support including an elongate conveyor table comprising a plurality of horizontally dispose rollers, said third workpiece support including a receiving table arranged to receive and support fully separated workpieces issuing from said separation unit, wherein the width of said receiving table is substantially greater than the width of said second workpiece support; and a feeder consisting of:

a pusher upstream of said cutting means and adjacent said elongate conveyor table, said pusher movable back and forth between respective distal ends of said elongate conveyor table in a substantially horizontal plane by a linear drive means, and downstream of said cutting means, a plurality of horizontally disposed driven rollers engageable with an underside of said elongate metallic workpiece;

said first and third workpiece supports extending in substantially a common horizontal plane and said second support movable in a direction substantially perpendicular to said common horizontal plane;

placing said elongate metallic workpiece on said first support;

aligning said substantially longitudinal axis of said elongate workpiece with said cutting means of said separation unit;

feeding said elongate workpiece through said separation unit to cut said separate sections;

supporting said separate sections; and constraining lateral movement of said elongate workpiece in said separation unit.

* * * * *